2,856,400
METHOD FOR THE MANUFACTURE OF LOW VISCOSITY CELLULOSE ACETATE DICARBOXYLATES

Carl J. Malm and Carlton L. Crane, Rochester, N. Y., assignors to Eastman Kodak Company, Rochester, N. Y., a corporation of New Jersey No Drawing. Application January 30, 1957
Serial No. 637,065

7 Claims. (Cl. 260—225)

This invention relates to the manufacture of low viscosity heat stable cellulose acetate dicarboxylates in which the cellulose acetate starting material is treated with a bath of acetic acid, water and sulfuric acid following which the sulfuric acid is neutralized with a divalent alkaline earth metal salt and the cellulose ester is esterified with a dicarboxylic acid anhydride and a catalyst, such as sodium acetate.

In the manufacture of compounds such as cellulose acetate phthalate having a considerable phthalyl content the products may be prepared either by the method described in Malm and Waring Patent No. 2,093,462 or by the method described in U. S. Patent No. 2,759,925 of Hiatt, Mench and Emerson. In the preparation of cellulose acetate phthalates having a phthalyl content of more than 30% and a substantial viscosity, it has been necessary to employ as the starting material cellulose acetate which has been considerably hydrolyzed such as down to an acetyl content of 30–32%. No set method has been found for the manufacture of cellulose acetate phthalates of high phthalyl content using commercially available cellulose acetates such as those having acetyl contents of 38–42%.

For cellulose acetate phthalates to be employed for coatings in photographic products, esters of lower viscosity and lower phthalyl content are usually considered. In the above methods for making cellulose acetate phthalates, viscosity reduction cannot be satisfactorily accomplished simultaneously with the phthalation procedure. Various problems arise in such procedures which involve difficulties in preparing the products desired.

One object of our invention is to provide a process of preparing low viscosity cellulose acetate dicarboxylates having desirable properties for use in the preparation of photographic products. Another object of our invention is to provide a procedure for preparing cellulose acetate dicarboxylates which employs commercially available cellulose acetate as the starting material. A still further object of our invention is to provide a process of preparing low viscosity cellulose acetate phthalates having contents of combined phthalyl within the range of 18–28%. A still further object of our invention is to provide a process for preparing low viscosity cellulose acetate dicarboxylate in which the viscosity reduction is primarily carried out prior to the dicarboxylation of the cellulose acetate. Other objects of our invention will appear herein.

We have found that cellulose acetate dicarboxylates having desirable properties can be obtained from the commercial types of cellulose acetate if the cellulose acetate is first treated with a bath made up of acetic acid having a certain water content which bath also contains sulfuric acid for a time sufficient to reduce the acetyl content of the cellulose acetate to 26–34% and the intrinsic viscosity to a value of not more than 0.5 following which the sulfuric acid is neutralized with a divalent alkaline earth metal neutralizing agent. If desired the water present may be removed by adding acetic anhydride to the mass in an aproximately equimolar amount. There follows esterification of the cellulose ester with a dicarboxylic acid anhydride and a material which exhibits basic properties in the aliphatic acid solution in which the esterification is carried out. Although our procedure will be described in terms of preparing phthalates, it is to be understood that other cellulose acetate dicarboxylates, such as the succinate or the maleate, may be prepared by using the appropriate dicarboxylic acid anhydride.

In the preparation of a cellulose acetate phthalate, for instance, in accordance with the procedure of our invention, a cellulose acetate having an acetyl content within the range of 38–42% is used as the starting material. This cellulose acetate is immersed in a liquid composed of acetic acid and sulfuric acid. The acetic acid used is of 85–94% strength, the remainder being water (6–15% water) which acid also contains sulfuric acid in an amount of 2–8% based on the weight of the cellulose acetate. The ratio of liquid to cellulose acetate is desirably within the range of 1.0–3:1. The strength of acetic acid employed is critical as the water content of the acetic acid should not be less than 6% or more than 15% for the desired results. This mass is kept at an elevated temperature for a sufficient time to reduce the acetyl of the cellulose acetate to 26–34% and the intrinsic viscosity to a value not exceeding 0.5. This treatment can be conveniently carried out at a temperature within the range of 140–200° F., the time of treatment being governed by the time necessary to obtain the desired conditions. Ordinarily this treatment will be completed in one to three hours at 180° F.

After the acetyl content and intrinsic viscosity of the cellulose acetate has been reduced to the degree desired, there results a low viscosity hydrolyzed cellulose acetate which contains significant amounts of combined sulfur. To prepare a product of good heat stability, it is desirable to reduce this content of combined sulfur by neutralizing all of the sulfuric acid which was used in the hydrolysis and depolymerization step with a substantially equivalent amount of divalent alkaline earth metal neutralizing agent such as magnesium carbonate, magnesium oxide, magnesium acetate or the like. After this has been accomplished, the mass may or may not be rendered anhydrous with acetic anhydride. The cellulose acetate is then ready for phthalation.

The treatment with the alkaline earth metal neutralizing agent may be accomplished by either of two methods. By one method only a portion of the sulfuric acid is initially neutralized, the mass is allowed to stand for 5–60 minutes at a temperature within the range of 140–200° F. followed by neutralization of the remainder of the sulfuric acid. The second alternative neutralization method involves adding the neutralizing agent in solid form over a short period of time directly to the mass accompanied by stirring which stirring action gradually disperses the solid throughout the reaction bath. For instance, the neutralizing agent, such as magnesium carbonate may be added as a fine powder to the mass being agitated over a period of 5–60 minutes. Optionally the mass may then be rendered anhydrous with acetic anhydride. The cellulose acetate is then esterified by adding thereto phthalic anhydride and an acid soluble salt which exhibits basic properties in an aliphatic acid solution, such as sodium acetate. Some of the catalysts which are useful in promoting this esterification are the acetates, propionates or butyrates of the alkali metals, the alkaline earth metals, ammonia or the organic amines as pointed out in U. S. Patent No. 2,759,925 of Hiatt et al. In carrying out the esterification it is ordinarily desirable to use for each part of cellulose acetate starting material from 0.5 to 2 parts of phthalic anhydride and from 0.1 to 1 part of catalyst. The phthalation reaction can most conveniently be carried out at a temperature within the range of 140-200° F. in a time of 2-6 hours. The product which is obtained is one having a combined phthalyl content within the range of 18-28% and preferably 20-24%. The product obtained should also exhibit a viscosity of 18-80 cps. in solution in ethanol-methyl Cellosolve-water 50:30:20 at 15% concentration in this solvent and at 25° C. The product which is obtained exhibits good heat stability. The following examples illustrate our invention:

*Example 1*

24.6 parts of cellulose acetate having an acetyl content of 39½% and containing .6 part of water were mixed in a jacketed sigma bladed mixer with 3½ parts of distilled water and 27.8 parts acetic acid. The mixture was stirred while raising the temperature to 160° F. over a period of 30 minutes. A mixture of 0.5 part of 96.5% $H_2SO_4$ and 2.3 parts acetic acid was added to the mixer and the temperature was raised to 180° F. over a period of 15 minutes and was maintained at that temperature until a sample gave a viscosity of 3½ seconds. This viscosity was that determined from a mixture of 20 grams of the solution and 20 ccs. of a 1:1 mixture of acetic acid and distilled water, the viscosity having been determined as the time required for a ⅛ inch steel ball to drop 10 centimeters therein in a ½ inch diameter test tube at 25° C. There was then added over a period of 5 minutes, 0.43 part of 95% pure magnesium carbonate dispersed in 1.8 parts of acetic acid. The mass was stirred an additional 5 minutes and 4.4 parts of anhydrous sodium acetate with 30 parts of phthalic anhydride were added to the mixer. The reaction temperature was adjusted to 150° F. and the mass was stirred for 4 hours at that temperature whereby the cellulose acetate phthalate product was formed. There was then added 100 parts of distilled water and the mass was stirred and cooled to 50° F. over a period of 2¼ hours. A fine powder product was obtained which was drained, washed in successive changes of distilled water at 120° F. until the mass was substantially free of acid whereupon it was dried at 130° F. The product obtained was analyzed for phthalyl and the viscosity and heat stability were determined with the following results:

Apparent phthalyl_____percent__ 25.7
Viscosity at 15% concentration in ethanol, methyl
  Cellosolve, water 50:30:20 at 25° C_____cps__ 42
Heat stability 2½ hours at 140° C_____ good

*Example 2*

360 parts of cellulose acetate having 39.5% combined acetyl and 2.7% moisture were added to a jacketed sigma bladed mixer to which was also added a mixture of 53 parts distilled water and 435 parts of acetic acid. The mixture was stirred and heated to 180° F. over a period of 30 minutes. There was then added a mixture of 27 parts of acetic acid and 7.2 parts of 96.8% sulfuric acid and the mass was stirred and maintained at 180° F. until it had a viscosity of 4½ seconds determined by the method described at the like point in Example 1.

6.4 parts of magnesium carbonate were added to the mass which was stirred at 185° F. for 5 minutes. There was then added 64 parts of sodium acetate and 430 parts of phthalic anhydride and the mixture was heated and stirred for 4 hours at 152° F. 1500 parts of cold distilled water (33° F.) were added to the mixer. The mixture was stirred and the temperature was reduced to 65° F. over a period of 30 minutes. The cellulose acetate phthalate obtained precipitated in the form of a fine granular product. The product was washed in successive changes of distilled water (130° F.) until substantially free of phthalic acid. It was drained and dried at 140° F. Analysis indicated the following:

Apparent phthalyl_____percent__ 24.8
Free phthalic acid_____do____ 1.3
Viscosity at 15% concentration in ethanol, methyl
  Cellosolve, water 50:30:20 at 25° C_____cps__ 64

*Example 3*

382 parts of 39.5% acetyl cellulose acetate containing 2% moisture were placed in a mixer having a sigma shaped blade with a mixture of 60.5 parts of distilled water and 456 parts of acetic acid. After heating and stirring for 15 minutes to 176° F. there was then added a mixture of 29 parts acetic acid and 9.7 parts of 96.8% sulfuric acid. The stirred mass was heated to 180° F. until a sample of the mass exhibited a viscosity value of 1.7 seconds. One-half of a mixture of 10.4 parts of magnesium carbonate in 40 parts of acetic acid was added to the mixer which mass was stirred and maintained at 180° F. for 15 minutes. The remainder of the magnesium carbonate dispersion was added to the mixer followed by the addition of 69 parts of sodium acetate and 482 parts of phthalic anhydride. After stirring and heating for 4 hours at 150° F. the cellulose acetate phthalate product resulted.

1800 parts of distilled water (33° F.) were added to the mixer and the mixture was cooled to less than 70° F. as rapidly as possible. A fine cellulose acetate phthalate slurry formed. The product was washed in 130° F. distilled water and then dried at 140° F. The cellulose acetate phthalate obtained analyzed as follows:

Apparent phthalyl_____percent__ 28.2
Free phthalic acid_____do____ 2.5
Viscosity at 15% concentration in ethanol, methyl
  Cellosolve, water 50:30:20 at 25° C_____cps__ 23.5
Heat stability 2¼ hours at 140° C_____ good

*Example 4*

8.2 pounds of 39.5% acetyl cellulose acetate were placed in a jacketed sigma-bladed mixer with a mixture of 1.2 pounds of distilled water and 10.2 pounds of glacial acetic acid. The temperature was raised to 155° F. and while continuing the mixing, there was added thereto a solution of 53.2 ccs. of 94.5% sulfuric acid in 0.6 pound of acetic acid. The temperature was raised to 180° F. over a period of 45 minutes and was maintained at that temperature until a sample of the mass gave a first-stage viscosity of 1.3 seconds by the viscosity method described in Example 1. A solution of 50 grams of 85% pure magnesium carbonate in 180 grams of acetic acid was added followed by the addition, over a period of 15 minutes, of a second solution of 50 grams of the magnesium carbonate in 180 grams of acetic acid. 1.5 pounds of sodium acetate was mixed in followed by the slow addition of 6.4 pounds of 97% acetic anhydride, the rate of addition being such that the temperature of the mass did not exceed 220° F. After mixing for 5 minutes, there was added 10.3 pounds of phthalic anhydride. The mixer was then run for three hours at 180° F. The cellulose acetate was thereby phthalated.

The mass was cooled to 70° F. and 37 pounds of distilled water was mixed in and the mass was stirred until a fine precipitate was obtained. The cellulose acetate phthalate precipitate was separated from the mass, washed with distilled water until substantially free of acid and dried at 150° F. Analysis showed that the cellulose acetate phthalate obtained had a combined phthalyl content of 24.2%.

We claim:

1. A method of preparing low viscosity cellulose acetate dicarboxylates which comprises treating cellulose acetate having an acetyl content of 38-42% with aqueous acetic acid of 85-94% strength, which acid contains 2-8% of sulfuric acid, based on the cellulose acetate treated, at 140-200° F. until the acetyl content of the cellulose acetate is 26–34% and its intrinsic viscosity is not more than 0.5, neutralizing the sulfuric acid of the mass with a substantially equivalent amount of a magnesium compound neutralizing agent, and subsequently esterifying the cellulose acetate with an esterification bath comprising a dicarboxylic acid anhydride and, as the catalyst, an acid soluble salt which is basic in non-aqueous aliphatic acid solution.

2. A method of preparing a low viscosity cellulose acetate phthalate which comprises treating cellulose acetate of 38–42% acetyl content with aqueous acetic acid of 85–94% concentration which acid contains 2–8% of sulfuric acid, based on the weight of the cellulose acetate, at 140–200° F. until the acetyl content of the cellulose acetate is 26–34% and its intrinsic viscosity does not exceed 0.5, neutralizing the sulfuric acid in the mass with a substantial equivalent amount of a magnesium compound neutralizing agent and subsequently esterifying the cellulose acetate with an esterification bath comprising phthalic anhydride and, as the catalyst, an acid soluble salt which is basic in non-aqueous aliphatic acid solution.

3. A method of preparing a low viscosity cellulose acetate dicarboxylate which comprises treating cellulose acetate of 38–42% acetyl content with aqueous acetic acid of 85–94% strength which which acid contains 2–8% of sulfuric acid, based on the weight of the cellulose acetate, at 140–200° F. until the acetyl content of the cellulose acetate is 26–34% and its intrinsic viscosity does not exceed 0.5, neutralizing the sulfuric acid with a substantially equivalent amount of a magnesium compound neutralizing agent and subsequently esterifying the cellulose acetate with an esterifying bath comprising a dicarboxylic acid anhydride and, as the catalyst, sodium acetate.

4. A method of preparing a cellulose acetate phthalate which comprises treating cellulose acetate of 38–42% acetyl with aqueous acetic acid of 85–94% concentration which acid contains 2–8% of sulfuric acid, based on the weight of the cellulose acetate, at 140–200° until the acetyl content of the cellulose acetate is 26–34% and its intrinsic viscosity does not exceed 0.5, neutralizing the sulfuric acid with a substantially equivalent amount of a magnesium compound neutralizing agent and subsequently esterifying the cellulose acetate by adding to the mass phthalic anhydride and, as the catalyst, sodium acetate.

5. A method of preparing a low viscosity cellulose acetate dicarboxylate which comprises treating cellulose acetate of 38–42% acetyl with aqueous acetic acid of 85–95% concentration which acid also contains 2–8% of sulfuric acid, based on the weight of the cellulose acetate, at 140–200° F. until the acetyl content of the cellulose acetate is 26–34% and its intrinsic viscosity does not exceed 0.5, neutralizing the sulfuric acid with a substantially equivalent amount of a magnesium compound neutralizing agent, rendering the mass anhydrous by adding sufficient acetic anhydride thereto to completely destroy the water in the mass and subsequently esterifying the cellulose acetate by adding to the mass dicarboxylic acid anhydride and, as the catalyst, an acid-soluble salt which is basic in non-aqueous aliphatic acid solution.

6. A method of preparing cellulose acetate phthalate which comprises treating cellulose acetate having a combined acetyl content on the order of 39% with aqueous acetic acid of 85–94% concentration which acid contains approximately 3% of sulfuric acid, based on the weight of the cellulose acetate, at approximately 180° F. until the combined acetyl content has been reduced to 26–34% and the intrinsic viscosity does not exceed 0.5, neutralizing the sulfuric acid with a substantially equivalent amount of magnesium acetate and subsequently phthalating the cellulose acetate by adding to the mass an amount of phthalic anhydride at least equal to the amount of cellulose acetate present and 5–15% of sodium acetate, based on the weight of the cellulose acetate being phthalated.

7. A method of preparing low viscosity cellulose acetate phthalate which comprises treating cellulose acetate having a combined acetyl content on the order of 39% with aqueous acetic acid of approximately 90% strength which acid contains approximately 3%, based on the weight of the cellulose acetate, of sulfuric acid at 180° F. until the combined acetyl content of the cellulose acetate has been reduced to 26–34% and the intrinsic viscosity to a value not exceeding 0.5, neutralizing the sulfuric acid in 2 steps which comprise adding a portion of magnesium acetate thereto and then adding the remainder of the magnesium acetate over a period of time on the order of 15 minutes, adding sodium acetate catalyst to the mass, rendering the mass anhydrous with acetic anhydride, then adding phthalic anhydride to form a phthalating bath and phthalating the cellulose acetate to a substantial extent whereby an alkali soluble cellulose acetate phthalate is obtained.

References Cited in the file of this patent

UNITED STATES PATENTS

| | | |
|---|---|---|
| 2,093,462 | Malm et al. | Sept. 21, 1937 |
| 2,126,460 | Genung | Aug. 9, 1938 |
| 2,183,982 | Blanchard et al. | Dec. 19, 1939 |
| 2,285,536 | Seymour et al. | June 9, 1942 |
| 2,759,925 | Hiatt et al. | Aug. 21, 1956 |
| 2,768,161 | Malm et al. | Oct. 23, 1956 |